(12) United States Patent
Brunner et al.

(10) Patent No.: US 11,565,815 B2
(45) Date of Patent: Jan. 31, 2023

(54) LAVATORY WASTE TUBE CONNECTION SYSTEMS AND RELATED METHODS

(71) Applicant: The Boeing Company, Chicago, IL (US)

(72) Inventors: Jordan R. Brunner, Seattle, WA (US); Nicholas J. Lewis, Mukilteo, WA (US)

(73) Assignee: THE BOEING COMPANY, Chicago, IL (US)

(*) Notice: Subject to any disclaimer, the term of this patent is extended or adjusted under 35 U.S.C. 154(b) by 121 days.

(21) Appl. No.: 16/806,586

(22) Filed: Mar. 2, 2020

(65) Prior Publication Data

US 2021/0269156 A1 Sep. 2, 2021

(51) Int. Cl.
*B64D 11/02* (2006.01)
*E03D 11/17* (2006.01)
*E03D 11/16* (2006.01)

(52) U.S. Cl.
CPC .............. *B64D 11/02* (2013.01); *E03D 11/16* (2013.01); *E03D 11/17* (2013.01)

(58) Field of Classification Search
CPC .......... B64D 11/02; E03D 11/17; E03D 11/16
USPC ............................................. 4/428, 458, 695
See application file for complete search history.

(56) References Cited

U.S. PATENT DOCUMENTS

| 1,650,155 | A | * | 11/1927 | Randle | B60R 15/04 4/458 |
| 6,782,561 | B2 | * | 8/2004 | Sigler | E03D 11/16 4/458 |
| 2005/0230550 | A1 | * | 10/2005 | Dominguez | B64D 11/02 244/129.5 |
| 2019/0085547 | A1 | * | 3/2019 | Valedez Magana | E03D 11/16 |
| 2021/0164213 | A1 | * | 6/2021 | Earnest | E03D 11/16 |

* cited by examiner

*Primary Examiner* — Tuan N Nguyen
(74) *Attorney, Agent, or Firm* — Hanley, Flight & Zimmerman, LLC (57) ABSTRACT

Example lavatory waste tube connection systems and related methods are discoed herein. An example apparatus includes an extension tube to be coupled to a system waste tube and a junction box to be coupled to a surface of a vehicle lavatory. The junction box is to define a housing for the extension tube.

20 Claims, 9 Drawing Sheets

LAVATORY WASTE TUBE CONNECTION SYSTEMS AND RELATED METHODS

FIELD OF THE DISCLOSURE

This disclosure relates generally to vehicle waste systems and, more particularly, to lavatory waste tube connection systems and related methods.

BACKGROUND

Components of an aircraft lavatory system, such as a toilet, waste tube(s), a sink, etc., are typically assembled and positioned within a lavatory cabin prior to the lavatory cabin being installed in a fuselage of an aircraft. The lavatory cabin is generally compact in size to enable the lavatory cabin to fit within a predetermined area of the aircraft fuselage.

SUMMARY

An example apparatus includes an extension tube to be coupled to a system waste tube, and a junction box to be coupled to a surface of a vehicle lavatory. The junction box is to define a housing for the extension tube.

An example method includes coupling an extension tube to a system waste tube of a vehicle and positioning a junction box over the extension tube. The junction box defines an opening of a lavatory cabin in the vehicle. The example method includes coupling a cover to the junction box. The extension tube is to extend above the cover. The example method includes coupling the extension tube to an outlet of a waste receptacle of the lavatory cabin.

An example kit includes an extension tube to be coupled to a system waste tube. The kit includes a junction box. The junction box has a first height at a first end and a second height at a second end. The extension tube is to be at least partially disposed in the junction box when the junction box is coupled to a surface of a lavatory.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

An aircraft typically includes one or more lavatories at one or more locations in an aircraft fuselage. For example, the aircraft may include a first lavatory adjacent a cockpit of the aircraft and a second lavatory at an opposite end of the fuselage near the rear of the aircraft. These known lavatories and components thereof (e.g., a toilet, a sink, waste tube(s)) are often manufactured and assembled in a lavatory cabin prior to the lavatory cabin being installed in the aircraft fuselage.

The fuselage of the aircraft includes a system waste tube to carry waste from a waste receptacle (e.g., a toilet) in the lavatory cabin to a waste tank. Known lavatories include a lavatory waste tube coupled to the waste receptacle. The location of the system waste tube in the fuselage defines location(s) where the lavatory cabin can be installed in the fuselage so that the lavatory waste tube that extends from the waste receptacle can be fluidly coupled to the system waste tube of the aircraft.

The lavatory cabin is typically compact in size and, thus, there is a small space within which an operator (e.g., a mechanic) has to maneuver to couple (e.g., mechanically couple) the lavatory waste tube to the system waste tube of the aircraft after the lavatory cabin is installed in the fuselage. Further, coupling these waste tubes together can be difficult because the system waste tube of the aircraft is often located beneath a floor of the fuselage that supports the lavatory cabin. In a known aircraft, the system waste tube is disposed beneath the floor of the fuselage on which the lavatory cabin rests so that the system waste tube is not damaged prior to installation of the lavatory in the fuselage (e.g., if the system waste tube extended above the fuselage floor prior to installation of the lavatory, the system waste tube could be damaged during the installation of the lavatory cabin and/or other components of the aircraft (e.g., seat(s)) and/or subject to wear from exposure, etc.). Additionally, coupling the lavatory waste tube and the system waste tube includes providing a seal at the coupling, which increases the complexity of the coupling between the tubes. Thus, to couple the lavatory waste tube to the system waste tube, an operator may reach down beneath the floor of the lavatory cabin with limited visibility to couple the waste tubes together and secure the coupling in place.

To improve ease of coupling the waste tubes, some known aircraft manufacturers increase a size of cutouts in the floor(s) of the lavatory and/or the fuselage in an effort to provide an operator with an increased area of access to the system waste tube to complete the waste tube connector coupling. However, these floor cutouts limit the possible locations where the lavatory can be placed within an aircraft cabin due to the geometry of the aircraft system waste tube and in view of potential interference of the system waste tube and/or floor cutouts in the fuselage with other components of the aircraft.

Disclosed herein are example lavatory waste tube connection systems that provide improved means of coupling a waste tube in lavatory cabin to a system waste tube of a vehicle such as an aircraft. Examples disclosed herein include an extension tube that is to be coupled to the system waste tube. In examples disclosed herein, the extension tube extends the system waste tube above a floor of a lavatory cabin when the cabin is installed in the aircraft fuselage. As a result, examples disclosed herein provide for improved ease of access to the system waste tube during coupling of the system waste tube to the lavatory waste tube that extends from a waste receptacle (e.g., a toilet) in the lavatory cabin. In some examples disclosed herein, a junction box is to be coupled to a floor of the lavatory cabin to define a housing for the extension tube. Examples disclosed herein provide a seal between the extension tube and the lavatory waste tube at the junction box to secure the coupling between the waste tubes.

Figure 1:
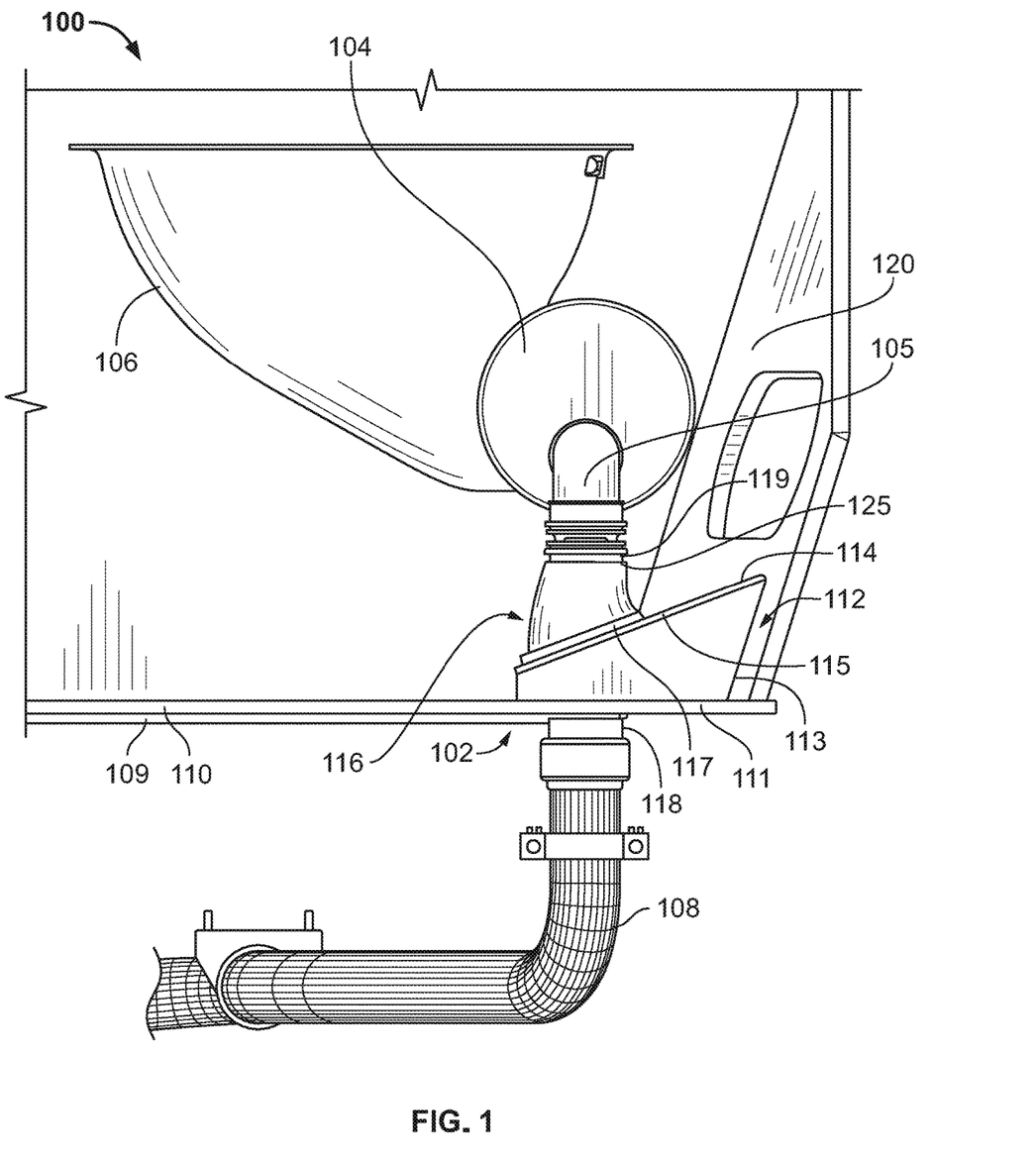
FIG. 1 is a side view of an example vehicle lavatory cabin including an example lavatory waste tube connection system in accordance with teachings of this disclosure.

FIG. 1 is a partial view of an example vehicle lavatory cabin 100 including an example lavatory waste tube connection system 102 in accordance with teachings of this disclosure. The example vehicle lavatory cabin 100 of FIG. 1 includes a valve 104 and a waste receptacle 106 (e.g., a toilet). In the illustrated example, the valve 104 controls the pressure (e.g., low pressure, vacuum, etc.) within the lavatory waste tube connection system 102. As shown in FIG. 1, a vacuum outlet tube 105 extends from the valve 104. When the lavatory cabin 100 is installed in a vehicle such as an aircraft, the waste receptacle 106 is coupled to a system waste tube 108 of the vehicle via the vacuum outlet tube 105 and the lavatory waste tube connection system 102. The system waste tube 108 carries waste that is removed from the waste receptacle 106 via the valve 104 to a waste tank of the vehicle for storage until the waste can be disposed of (e.g., after the aircraft has landed).

In the illustrated example, the system waste tube 108 is disposed below a floor 110 of the vehicle lavatory cabin 100. In particular and as disclosed herein, the system waste tube 108 is disposed beneath a floor 109 of, for instance, a fuselage of an aircraft on which the lavatory cabin 100 rests when the lavatory cabin 100 is installed in the fuselage. The system waste tube 108 is accessed via cutouts in the floor of the fuselage and the floor 110 of the lavatory cabin 100.

Due to the position of the system waste tube 108 below the floor 110 of the lavatory cabin 100, it may be difficult for an operator to reach the system waste tube 108 to couple the system waste tube 108 to the waste receptacle 106 when the lavatory cabin 100 is installed in the vehicle. For instance, an operator would have to reach around and behind the waste receptacle 106 to access the system waste tube 108 and couple the system waste tube 108 to the vacuum outlet tube 105 via one or more connectors (e.g., tubes) of a known lavatory waste tube connection system. However, in contrast to known lavatory waste tube connection systems, the example lavatory waste tube connection system 102 of FIG. 1 extends the system waste tube 108 above the floor 110 of the lavatory cabin 100 and, thus, facilitates ease of coupling the waste receptacle 106 to the system waste tube 108.

In the example of FIG. 1, the lavatory waste tube connection system 102 includes a junction box 112, a junction box cover 114, a junction box boot 116, an extension tube 118, and a connector tube 119. In this example, the extension tube 118 is coupled to the system waste tube 108 (e.g., mechanically coupled via a screw fit). As disclosed herein, in some examples, the extension tube 118 is coupled to the system waste tube 108 prior to the lavatory cabin 100 being installed in the vehicle. The extension tube 118 serves as means for increasing a height of the system waste tube 108 and, in particular, extends the system waste tube 108 above the floor 110 of the lavatory cabin 100 when the cabin 100 is installed in the vehicle. In the example of FIG. 1, the extension tube 118 is fluidly coupled to the vacuum outlet tube 105 via the connector tube 119. Thus, the extension tube 118 and the connector tube 119 provide a fluid flow path between the waste receptacle 106 and the system waste tube 108.

At least a portion of the example extension tube 118 of FIG. 1 is disposed or housed in the junction box 112. As shown in FIG. 1, a first end 111 of the junction box 112 is coupled to the floor 110 of the lavatory cabin 100 and a second end 113 of the junction box 112 is coupled to a wall 120 (e.g., an interior wall) of the lavatory cabin 100 via one or more fasteners (e.g., mechanical fastener(s), chemical fastener(s)).

As shown in FIG. 1, the junction box cover 114 is coupled to a third end 115 of the junction box 112 opposite the first end 111 of the junction box 112 via one or more fastener(s) (e.g., mechanical fastener(s), chemical fastener(s)). The junction box cover 114 includes an opening through which at least a portion of the extension tube 118 and/or the connector tube 119 extends. In FIG. 1, the junction box boot 116 is coupled to the junction box cover 114 to provide means for sealing the junction box 112. In the example of FIG. 1, the junction box boot 116 also provides means for sealing the coupling between the extension tube 118 and the connector tube 119. In some examples, a first end 117 of the junction box boot 116 adjacent the junction box cover 114 has a first diameter, and a second end 125 of the junction box boot 116 opposite the first end 117 has a second diameter. In some examples, the second diameter is smaller than a diameter of the portion of the extension tube 118 or the connector tube 119 that extends through the junction box cover 114 and is surrounded by the second end 125 of the junction box boot 116 to provide a seal. The junction box boot 116 can be made of a flexible material such as a silicone material. Additional fitting(s) can be used to provide seal(s) between the extension tube 118 and the system waste tube 108, between the extension tube 118 and the connector tube 119, and/or between the vacuum outlet tube 105 and the connector tube 119.

Figure 2:
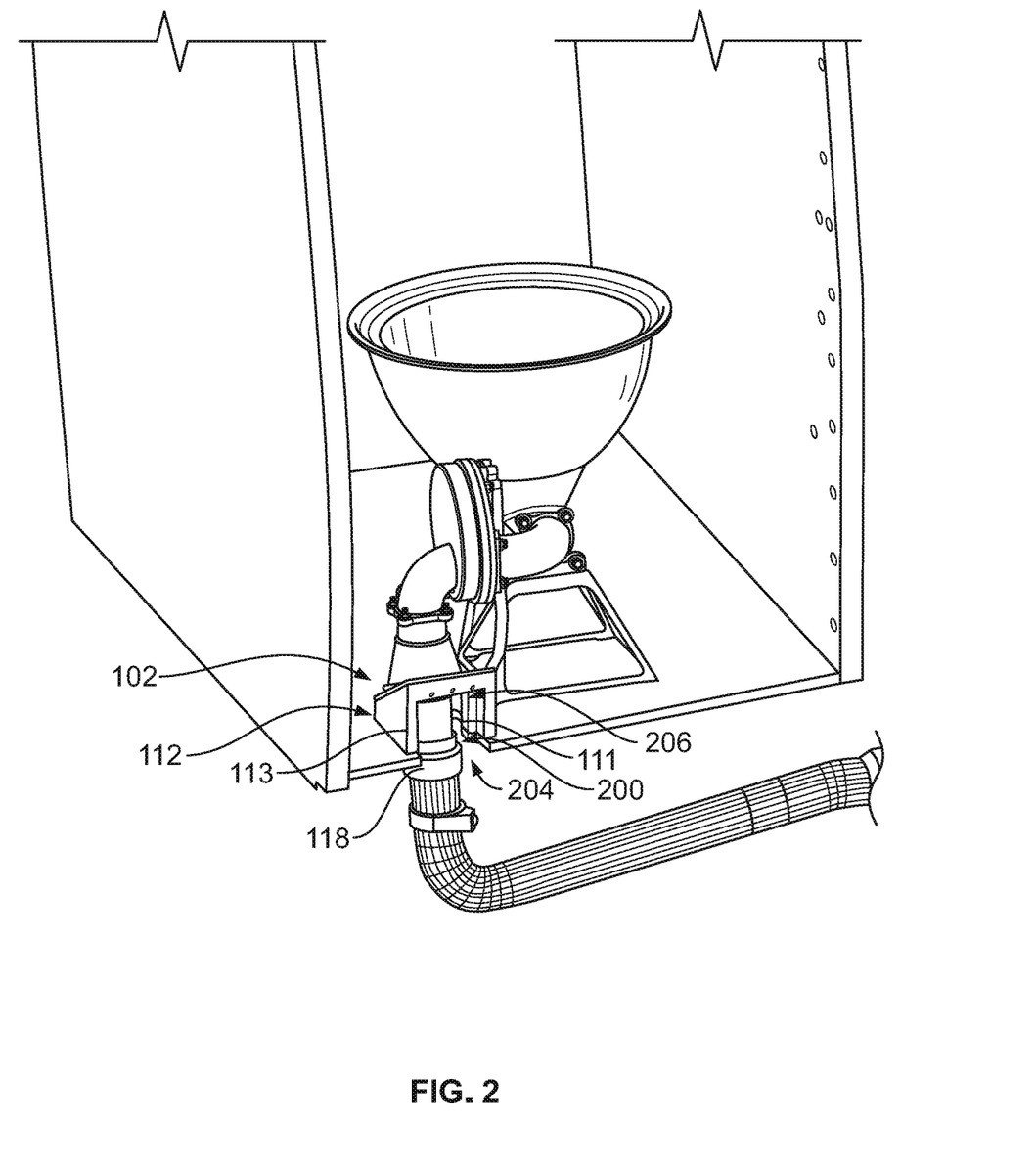
FIG. 2 is a rear perspective view of the example lavatory cabin of FIG. 1.

FIG. 2 is a rear perspective view of the example lavatory cabin 100 of FIG. 1. For illustrative purposes, the wall 120 of the lavatory cabin 100 is not shown in FIG. 2.

As shown in FIG. 2, the junction box 112 of the example lavatory waste tube connection system 102 includes a first opening 200 defined in the first end 111 (e.g., the floor-facing side) of junction box 112. As shown in FIG. 2, the first opening 200 of the junction box 112 is aligned with a floor opening or cutout 204 defined in the floor 110 of the lavatory cabin 100. The first opening 200 of the junction box 112 (and the corresponding floor opening 204) has a width that is greater than a diameter of the extension tube 118. In some examples, the first opening 200 has a width between 5-7 inches and a length between 4-6 inches. As also shown in FIG. 2, the second end 113 of the junction box 112 includes a second opening 206 that corresponds to a wall opening or cutout (FIG. 4) defined in the wall 120 (FIG. 1) of the lavatory cabin 100. The second opening 206 of the junction box (and the corresponding wall opening) has a width that is greater than a diameter of the extension tube 118 and a height that is greater than a height of the extension tube 118. In some examples, the second opening 206 has a height between 4-6 inches and a width between 4-6 inches. The first opening 200 and/or the second opening 206 of the junction box 112 can have different shape(s) and/or size(s) than the examples of FIG. 2.

In the example of FIG. 2, the junction box 112 receives a portion of the extension tube 118 that extends above the fuselage floor 109 (FIG. 1) and the floor 110 of the cabin 100 when the extension tube 118 is coupled to the system waste tube 108. As disclosed herein, during installation of the lavatory cabin 100, the openings in floor 110 and the wall 120 of the cabin are aligned with the extension tube 118. During installation, the cabin 100 slides over the extension tube 118 and the extension tube 118 is received in the junction box 112 via the openings 200, 206 of the junction box 112. Thus, the openings 200, 206 of the example junction box 112 (and the corresponding cutouts in the lavatory floor 110 and wall 120) are sized to allow extension tube 118 to pass through openings 200, 206 without interfering with junction box 112. As disclosed herein, the third end 115 of the junction box 112 also defines an opening (FIG. 4) through which the extension tube 118 extends when the extension tube 118 is disposed in the junction box 112.

In some examples, the junction box 112 is coupled to the floor 110 and the wall 120 of the cabin 100 prior to the cabin 100 being installed in the vehicle (e.g., the aircraft). In other examples, the junction box 112 is coupled to the floor 110 and the wall 120 after the lavatory cabin 100 has been positioned in the aircraft.

Figure 3:
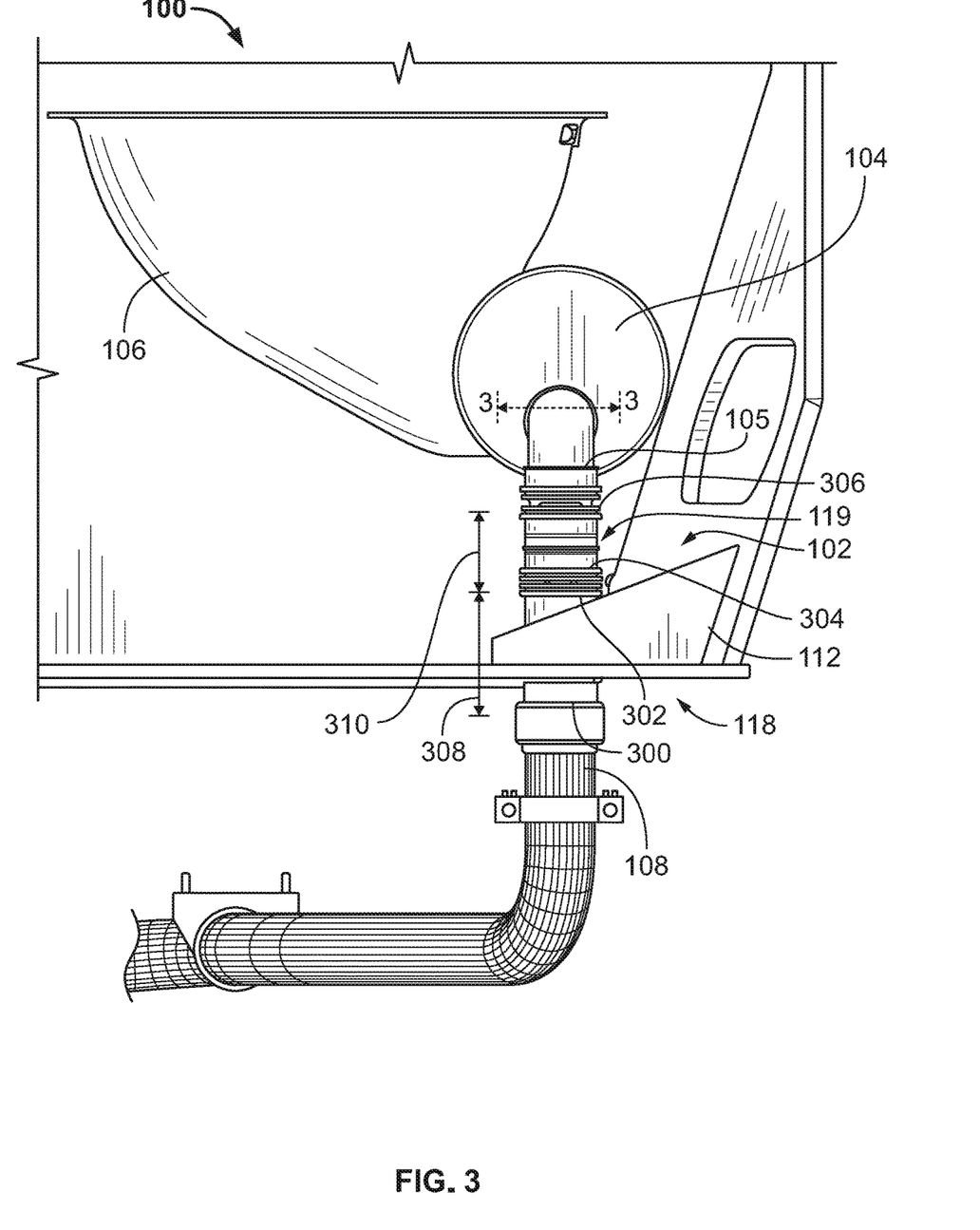
FIG. 3 is a side view of the example lavatory waste tube connection system of FIGS. 1 and 2.

FIG. 3 illustrates the example lavatory waste tube connection system 102 of FIGS. 1 and 2. For illustrative purposes, the junction box boot 116 is not shown in FIG. 3.

As shown in FIG. 3, a first end 300 of the extension tube 118 is coupled to the system waste tube 108 (e.g., via a mechanical fit such as a screw fit or an interference fit and/or via chemical fasteners). In examples disclosed herein, the coupling between the first end 300 of the extension tube 118 and the system waste tube 108 is located below the floor 110 of the lavatory cabin 100 when the lavatory cabin 100 is installed in the aircraft fuselage. As shown in FIG. 3, at least a portion of the extension tube 118 including a second end 302 of the extension tube 118 is received in the junction box 112 and, thus, extends the system waste tube 108 above the lavatory floor 110. The second end 302 of the extension tube 118 is coupled to a first end 304 of the connector tube 119 (e.g., via a mechanical fit such as a screw fit or an interference fit and/or via chemical fasteners). A second end 306 of the connector tube 119 is coupled to the vacuum outlet tube 105 of the valve 104 (e.g., via a mechanical fit such as a screw fit or an interference fit and/or via chemical fasteners). Thus, in the example of FIG. 3, the waste receptacle 106 is coupled to the system waste tube 108 via the extension tube 118 and the connector tube 119.

In the example of FIG. 3, the extension tube 118 and the connector tube 119 are separate pieces. In such examples, the connector tube 119 is coupled to the extension tube 118 after the extension tube 118 is received in the junction box 112. In other examples, the extension tube 118 and the connector tube 119 are formed as one unitary piece. In examples where the extension tube 118 and the connector tube 119 are formed as a unitary piece, a size of the opening (FIG. 4) formed in the wall 120 of the cabin 100 and the size of the opening 206 (FIG. 2) of the junction box 112 are designed to accommodate the increased height of the integrated extension tube 118 and connector tube 119.

As shown in FIG. 3, the extension tube 118 has a height 308 that extends the system waste tube 108 above the floor 110 of the lavatory cabin 100. Thus, the coupling between the extension tube 118 and the connector tube 119 occurs above the floor 110 of the lavatory cabin 100. In some examples, the height 308 of the extension tube 118 is between 4-8 inches. In the illustrated example, the connector tube 119 has a height 310 that extends the extension tube 118 and, thus, the system waste tube 108 coupled thereto, to the vacuum outlet tube 105 of the valve 104. Thus, the coupling between the connector tube 119 and the vacuum outlet tube 105 of the valve 104 also occurs above the floor 110. In some examples, the height 310 of the connector tube 119 is between 2-8 inches.

In some examples, the extension tube 118 and/or the connector tube 119 are made of a rigid material (e.g., titanium) to withstand the pressure produced by the valve 104 during disposal of waste in the waste receptacle 106. In other examples, one or more of the extension tube 118 and/or the connector tube 119 (and/or respective portions thereof) include a flexible material to provide for tolerance between couplings (e.g., to accommodate a degree of misalignment between the tubes).

Figure 4:
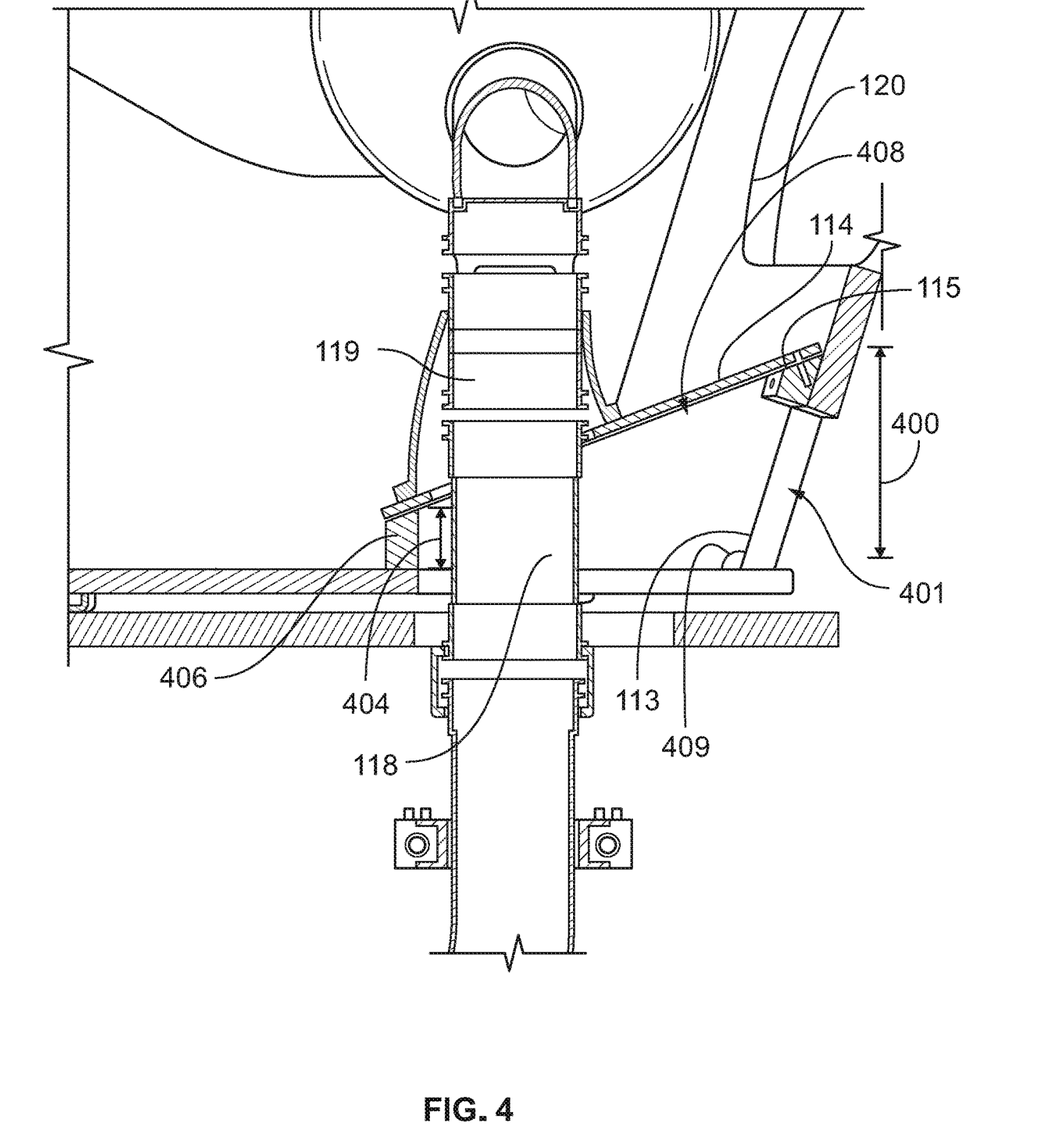
FIG. 4 is a cross-sectional view of the example lavatory waste tube connection system of FIG. 3 taken along the 3-3 line of FIG. 3.

FIG. 4 is cross-sectional view of the example lavatory waste tube connection system 102 of FIGS. 1-3 taken along the 3-3 line of FIG. 3. As shown in FIG. 4, the junction box 112 of the example lavatory waste tube connection system 102 has a first height 400 at the second end 113 of the junction box 112 and a second height 404 at a fourth end 406 of the junction box 112 opposite the second end 113 such that the third end 115 of the junction box 112 extending between the second end 113 and the fourth end 406 is angled or sloped. In this example, the first height 400 is greater than the second height 404. The first height 400 of the junction box 112 at the second end 113 is greater than a height of the extension tube 118 to allow the extension tube 118 to slide through an opening 401 formed in the wall 120 of the lavatory cabin 100 and the corresponding second opening 206 of the junction box 112 without interference.

In some examples, the second height 404 of the junction box 112 at the fourth end 406 is less than a height of the extension tube 118 such that the extension tube 118 extends above the junction box 112 at the fourth end 406. The third end 115 of the junction box 112 defines an opening 408 through which the extension tube 118 extends. The lower height of the junction box 112 at the fourth end 406 facilitates ease of access to the extension tube 118 when, for example, an operator couples the connector tube 119 to the extension tube 118. In particular, the lower height of the junction box 112 at the fourth end 406 of the junction box 112 prevents interference of the sidewalls that define the junction box 112 with the hands and/or arms of the operator when reaching for the extension tube 118.

The lower height of the junction box 112 at the fourth end 406 and the increased height of the junction box 112 at the second end 113 of the junction box 112 also facilitates ease of access to the second end 113 of the junction box when positioning the junction box cover 114 (FIG. 1) over the junction box 112 and securing the cover 114 to the third end 115 of the junction box 112 (e.g., via mechanical and/or chemical fastener(s)). For instance, the lower height of the fourth end 406 of the junction box 112 prevents or substantially prevents interference of the sidewalls of the junction box 112 with the hands/or arms of the operator as the operator reaches for the second end 113 of the junction box 112 to secure the cover 114 to the junction box 112 at the second end 113. Thus, the example lavatory waste tube connection eliminates or substantially eliminates ergonomic stresses associated with known waste tube connection systems.

As shown in FIG. 4, the junction box 112 is angled at the second end 113 at a first angle 409. In this example, the first angle 409 corresponds to an angle between the floor 110 and the wall 120 of the lavatory cabin 100. The angled design of the junction box 112 at the second end 113 allows the junction box 112 to rest substantially flush against the wall 120 of the lavatory cabin 100. The junction box 112 can have other shapes and/or sizes than the example shown in FIG. 4. For instance, the geometry of the junction box can be based on factors such as a size and/or shape of a lavatory cabin in which the junction box is to be installed.

FIGS. 5A-5F illustrate an example installation sequence of the lavatory waste tube connection system 102 of FIGS. 1-4 in accordance with teachings of this disclosure.

Figure 5A:
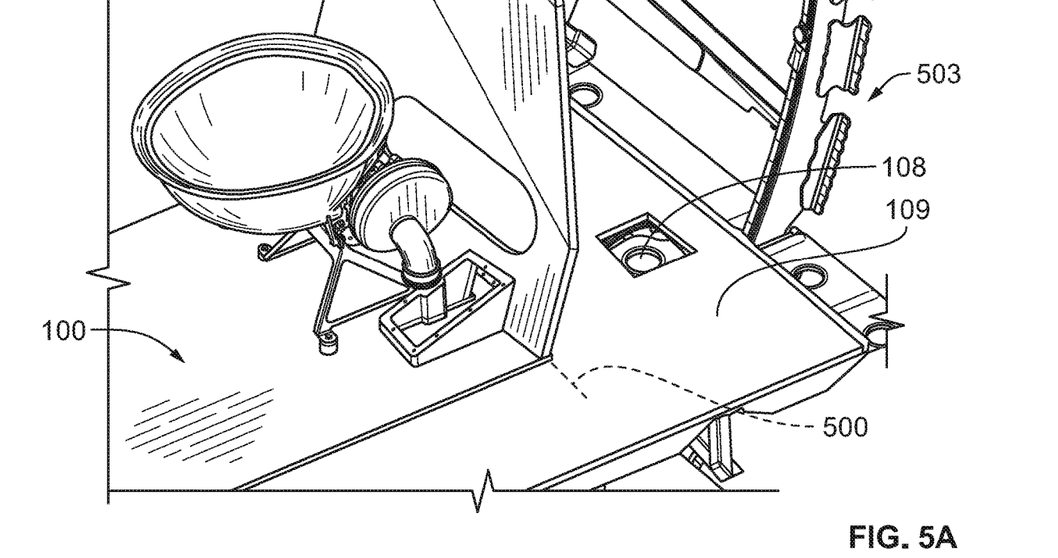
FIGS. 5A-5F illustrate an example installation sequence of the example lavatory waste tube connection system of FIGS. 1-4 in accordance with teachings of this disclosure.

As shown in FIG. 5A, prior to connection of the system waste tube 108 to the lavatory cabin 100, the system waste tube 108 is below the floor 109 of a fuselage 503.

Figure 5B:
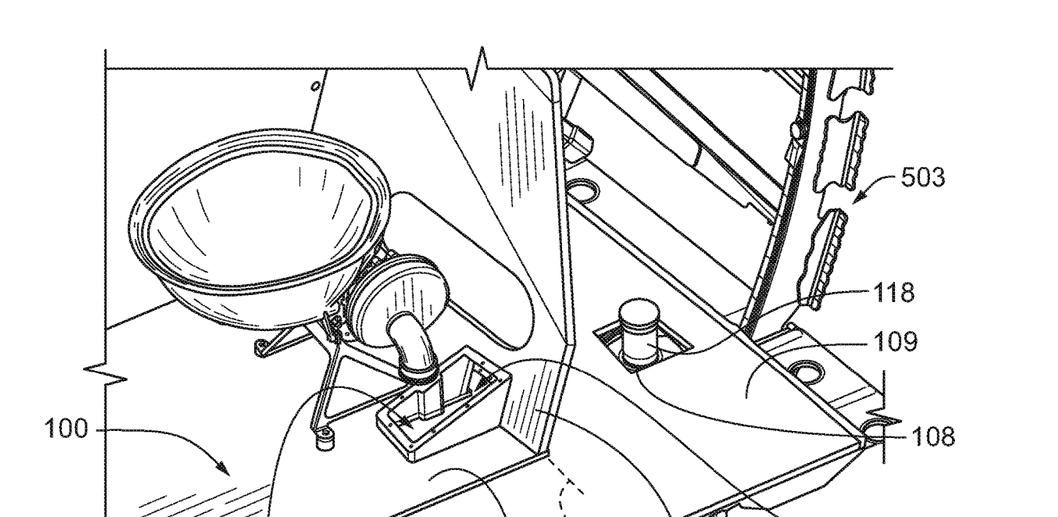

FIG. 5B illustrates the coupling of the extension tube 118 to the system waste tube 108 (e.g., via a mechanical coupling such as a screw fit). As shown in FIG. 5B, when the extension tube 118 is coupled to the system waste tube 108, the system waste tube 108 extends above the fuselage floor 109 via the extension tube 118.

Although the example lavatory cabin 100 is shown in the fuselage 503 in a first (uninstalled) position 500 in FIGS. 5A and 5B prior to the coupling of the waste receptacle 106 to the system waste tube 108, in other examples, the lavatory cabin 100 may not be disposed in the fuselage 503 until after the extension tube 118 is coupled to the system waste tube 108.

As shown in FIG. 5B, when the lavatory cabin 100 is disposed in the first uninstalled position 500, the opening 401 of the wall 120 and the opening 204 of the floor 110 of the lavatory cabin 100 are aligned with the extension tube 118.

Figure 5C:
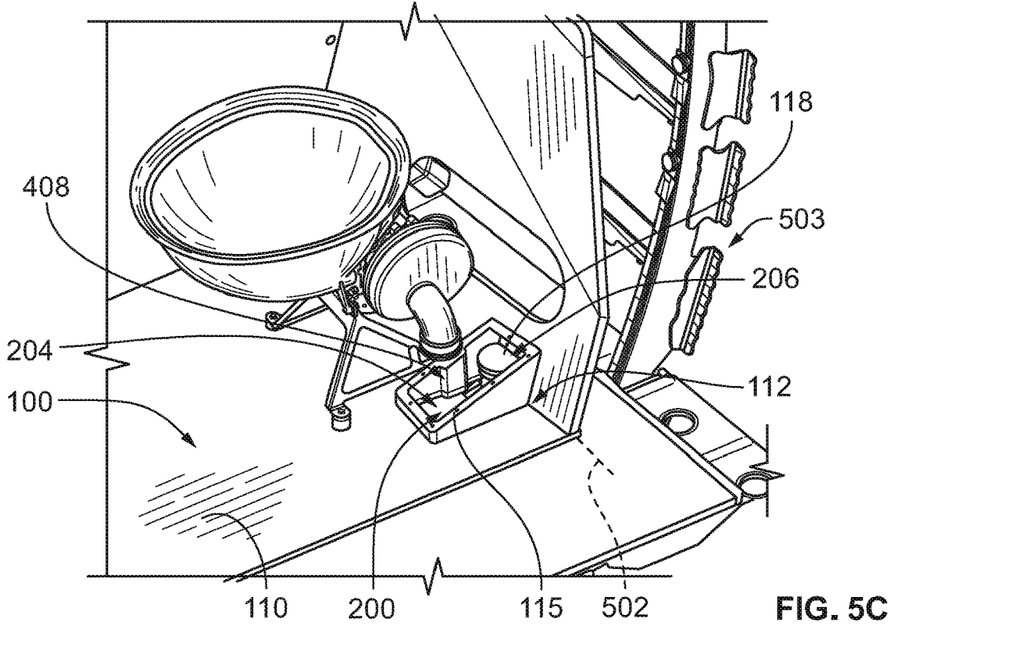

FIG. 5C illustrates the positioning of the extension tube 118 in the lavatory cabin 100. In this example, the lavatory cabin 100 is moved (e.g., slid) from the first (uninstalled) position 500 of FIGS. 5A and 5B to a second (partially installed) position 502 in the fuselage 503. As the lavatory cabin 100 moves toward and over the extension tube 118, the extension tube 118 passes through the opening 401 (FIG. 5B) in the wall 120 of the cabin 100 and the corresponding opening 206 in the junction box 112 and into the opening 204 formed in the floor 110 of the lavatory cabin 100 and the corresponding opening 200 in the junction box 112. As also show in FIG. 5C, the third end 115 of the junction box 112 also defines the opening 408 through which at least a portion of the extension tube 118 is received.

Although in FIGS. 5A-5C, the junction box 112 is shown in the lavatory cabin 100, in other examples, the junction box 112 is coupled to the floor 110 and the wall 120 of the lavatory cabin 100 after the lavatory cabin 100 is installed in the fuselage 503.

Figure 5D:
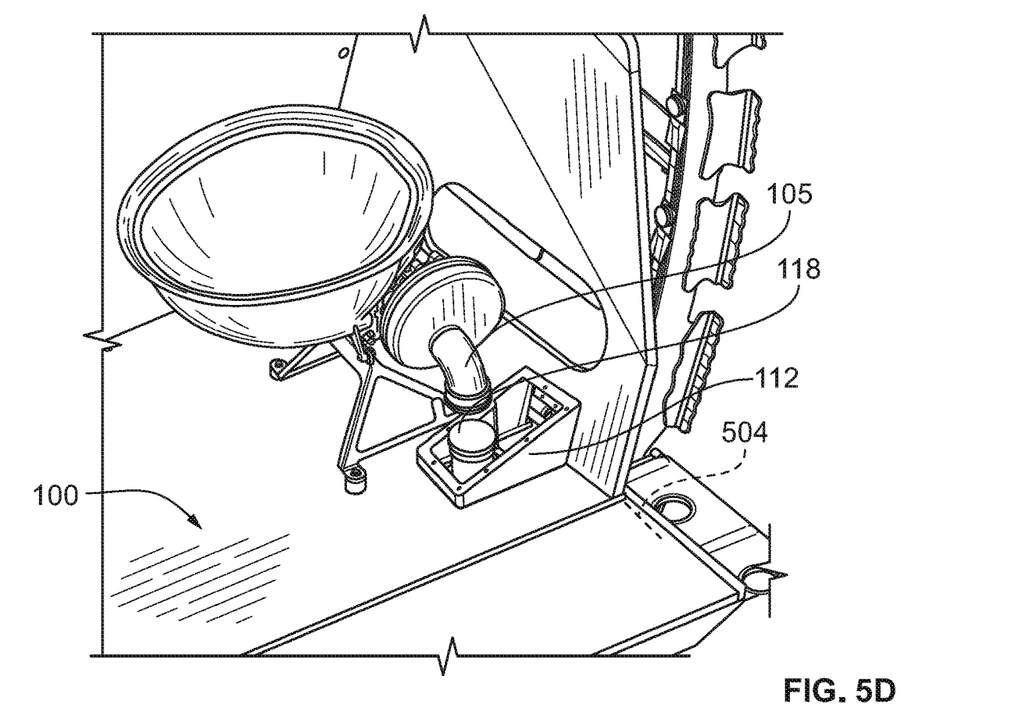

FIG. 5D shows the lavatory cabin 100 in a third (installed) position 504. As shown in FIG. 5D, when the lavatory cabin 100 is in the third (installed) position, the extension tube 118 is positioned in the junction box 112 such that the extension tube 118 is aligned with the vacuum outlet tube 105 of the valve 104.

Figure 5E:
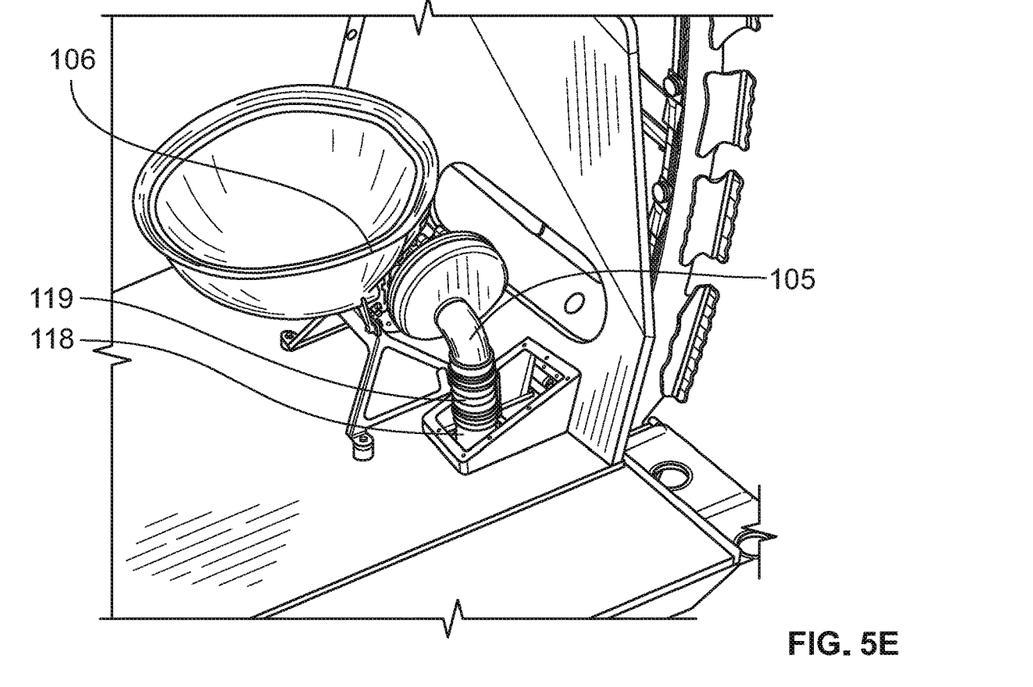

FIG. 5E illustrates the coupling of the connector tube 119 to the extension tube 118 and to the vacuum outlet tube 105, thereby coupling the waste receptacle 106 to the system waste tube 108 (FIG. 5A). As disclosed herein, in other examples, the connector tube 119 and the extension tube 118 are a unitary piece.

Figure 5F:
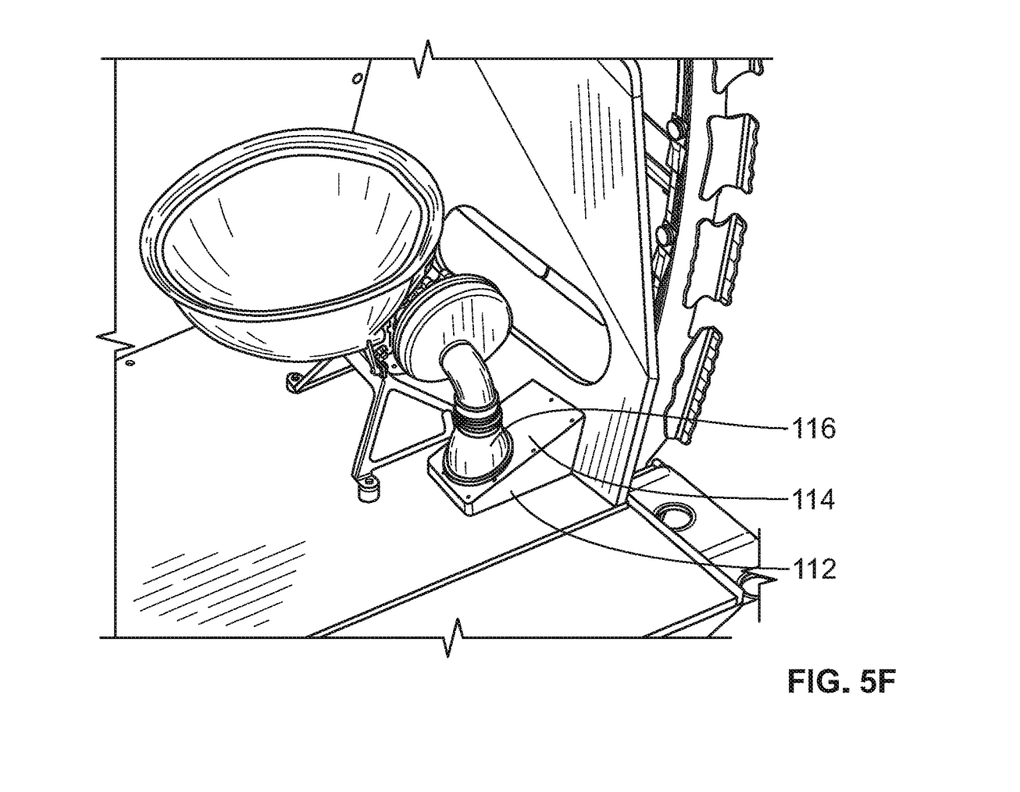

FIG. 5F illustrates the coupling of the junction box cover 114 to the junction box 112. FIG. 5F also illustrates the coupling the junction box boot 116 to the junction box cover 114 to provide a seal for the coupling between the system waste tube 108, the extension tube 118, and the connector tube 119.

Figure 6:
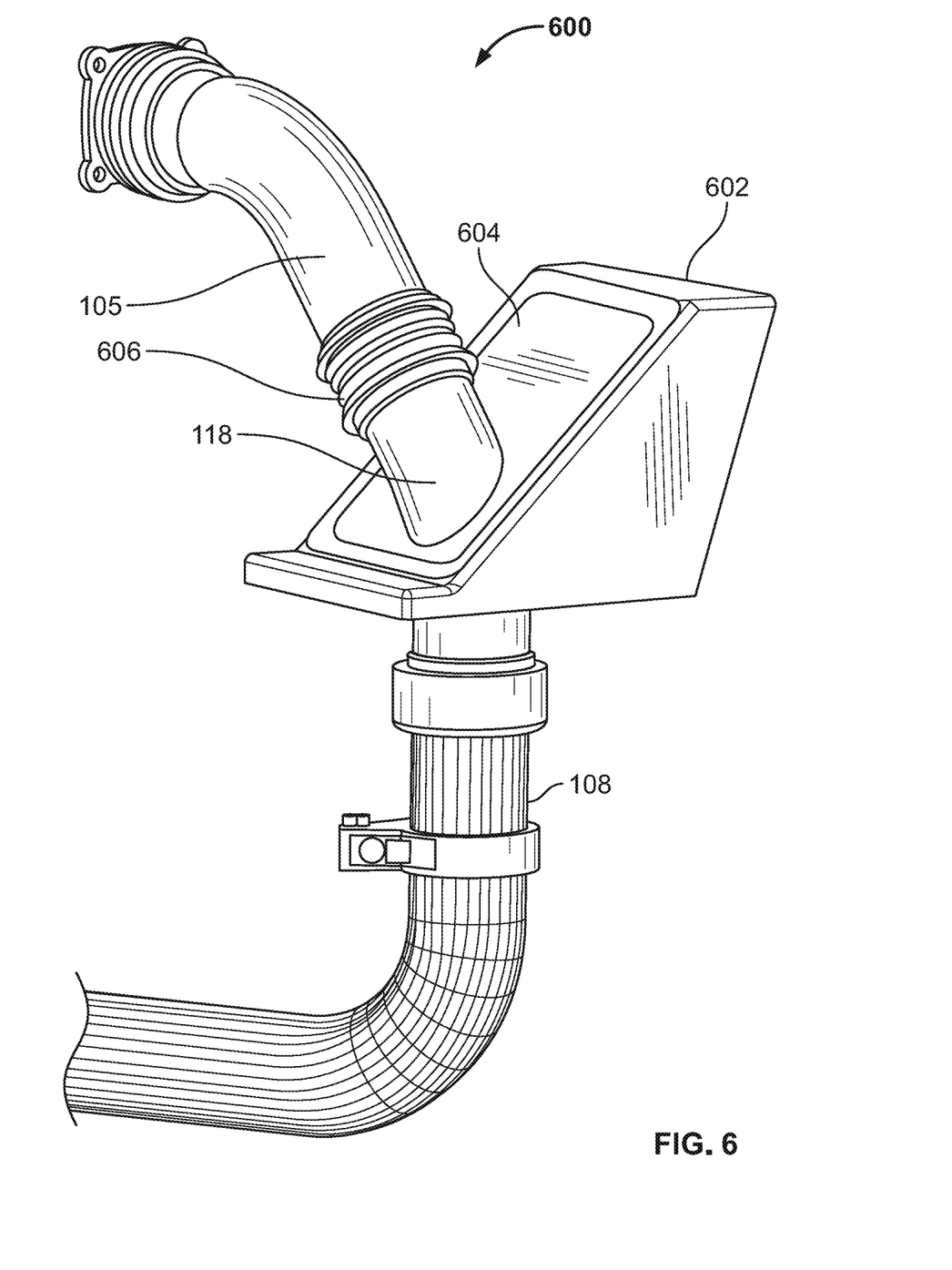
FIG. 6 illustrates another example lavatory waste tube connection system that may be implemented in the example vehicle lavatory cabin of FIG. 1 in accordance with teachings of this disclosure.

FIG. 6 illustrates another example lavatory waste tube connection system 600 that may be implemented in accordance with the teachings of this disclosure. The lavatory waste tube connection system 600 of the illustrated example operates in a similar manner as the example lavatory waste tube connection system 102 of FIGS. 1-4 and includes the extension tube 118 coupled to the system waste tube 108 to raise the system waste tube 108 above a floor of a fuselage (e.g., the fuselage floor 109 of FIG. 1) and a floor of a lavatory cabin (e.g., the floor 110 of the lavatory cabin 100). The extension tube 118 is at least partially disposed in a junction box 602. In some examples, the junction box 602 is the same or substantially the same as the junction box 112 of FIG. 1. However, in contrast to the lavatory waste tube connection system 102, the example lavatory waste tube connection system 600 of FIG. 6 does not include a junction box boot (e.g., the junction box boot 116 of the lavatory waste tube connection system 102 of FIGS. 1-4). Rather, in the example lavatory waste tube connection system 600 of FIG. 6, a junction box cover 604 provides means for sealing the junction box 602 and the coupling between the extension tube 118 and the system waste tube 108.

The junction box cover 604 of FIG. 6 can be coupled to the junction box 602 via one or more fasteners (e.g., mechanical fastener(s) such as clamp(s), chemical fastener(s)). The junction box cover 604 of the illustrated example is made of a sealing material (e.g., rubber) to provide means for sealing the junction box 602.

In the illustrated example of FIG. 6, the waste tube connection system 600 includes a fitting 606 that provides a seal between the extension tube 118 and the vacuum outlet tube 105 of the valve 104 (FIG. 1). In the example of FIG. 6, the fitting 606 includes a flexible material to provide for sealing and/or tolerance with respect to coupling the extension tube 118 to the vacuum outlet tube 105. In some example, a fitting similar to the fitting 606 is provided at each tube connection point to provide a seal, such as between the system waste tube 108 and the extension tube 118 to provide a seal at that coupling.

As shown in FIG. 6, in some examples, the extension tube 118 angled (as compared to the example show in FIGS. 1-5F). The extension tube 118 can have different configurations based on, for example, the angle of the vacuum outlet tube 105 to which the extension tube 118 is to be fluidly coupled. Thus, the extension tube 118 can be designed for different lavatories, system waste tubes, etc.

The example lavatory waste tube connection system 600 of FIG. 6 can be installed using a substantially similar installation sequence as disclosed in connection with FIGS. 5A-5F without the addition of a separate junction box boot.

Figure 7:
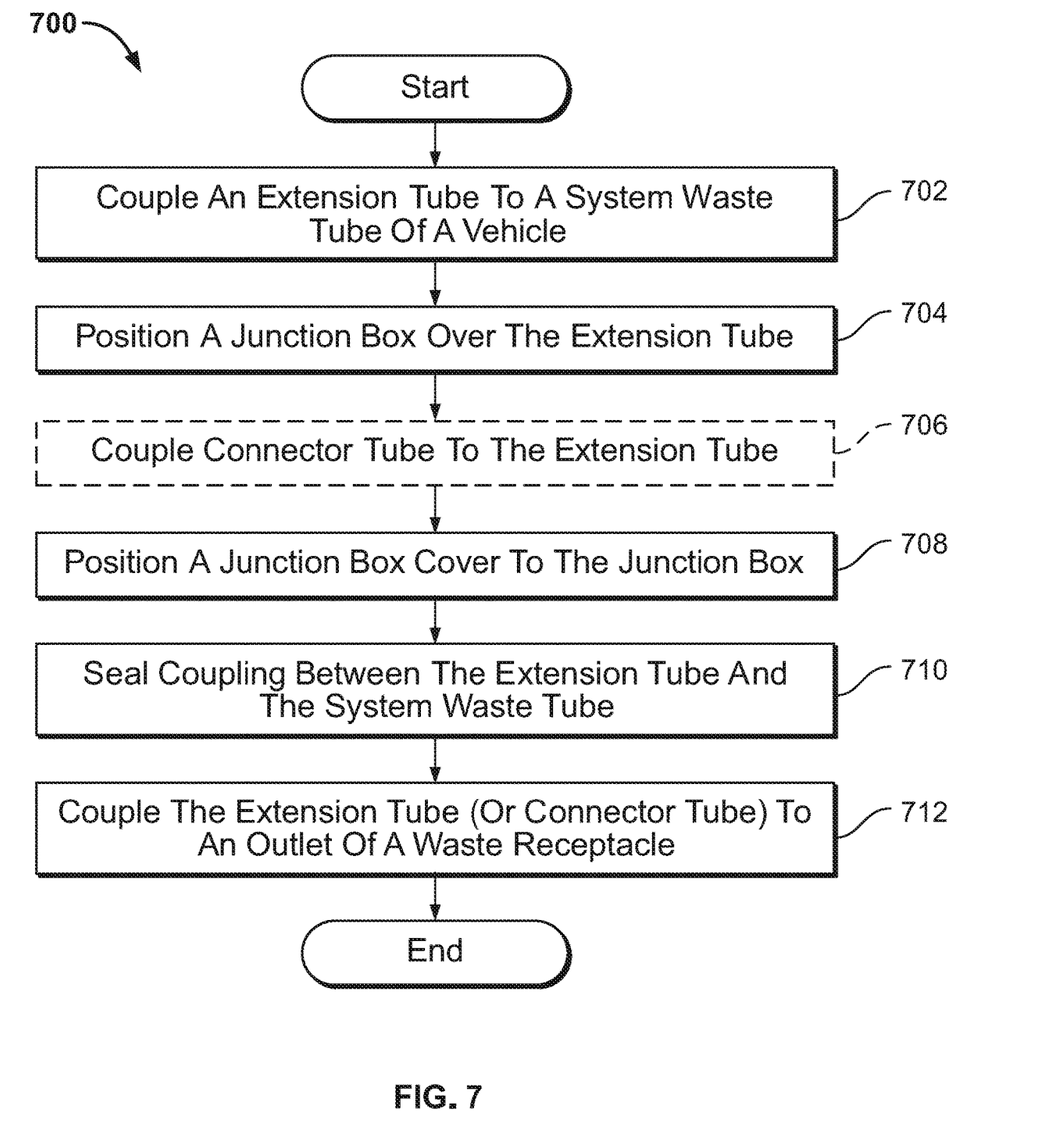
FIG. 7 is a flowchart of an example method to assemble a lavatory waste tube connection system in accordance with teachings of this disclosure.

FIG. 7 is a flowchart of an example method 700 to assemble a lavatory waste tube connection system (e.g., the example lavatory waste tube connection system 102 of FIGS. 1-4, the example lavatory waste tube connection system 600 of FIG. 6) in accordance with teachings of this disclosure. In some examples, the lavatory waste tube connection system 102 is provided as a kit including the extension tube 118, the connector tube 119 (in examples where the extension tube 118 and the connector tube 119 are separate pieces) or fitting 606, the junction box 112, 602, the junction box cover 114, 604, and, in some examples, the junction box boot 116. The components of the kit can be assembled during installation of the lavatory cabin 100 in a vehicle such an aircraft. However, any combination of components of the lavatory waste tube connection system 102, 600 may be included in the kit.

The example method 700 includes coupling an extension tube to a system waste tube of a vehicle, where the system waste tube is to be fluidly coupled to a waste receptacle (block 702). For example, the extension tube 118 of FIGS. 1-4 is coupled to the system waste tube 108 via a mechanical fastening (e.g., a screw fit, a press fit).

The example method 700 includes positioning a junction box over the extension tube (block 704). In some examples, the junction box 112, 602 is coupled to the floor 110 and the wall 120 of the example lavatory cabin 100 prior to the installation of the lavatory cabin 100 in the vehicle. In such examples, the junction box 112, 602 is positioned over the extension tube 118 as a result of the installation of the lavatory cabin 100 (e.g., as show in FIGS. 5A-5D). In other examples, the junction box 112, 602 is positioned over the extension tube 118 after the lavatory cabin 100 is installed in the vehicle.

In some examples, the example method 700 includes coupling a connector tube to the extension tube (block 706). For example, the connector tube 119 of FIG. 1 and/or the fitting 606 of FIG. 6 is coupled to the extension tube 118 (e.g., via a mechanical fit) as shown in the example of FIG. 1. In some examples, the connector tube 119 and the extension tube 118 are a unitary piece. In some examples, the connector tube 119 is not used if the height of the extension tube 118 is sized and/or positioned such that additional height is not needed to couple the extension tube 118 to the vacuum outlet tube 105. In such examples, the fitting 606 may be used to provide a seal between the extension tube 118 and the vacuum outlet tube 105.

The example method 700 includes coupling a junction box cover to the junction box (block 708). For example, the junction box cover 114, 604 is coupled to the junction box 112, 602 to facilitate sealing of the coupling between the extension tube 118 and the system waste tube 108. At least a portion of the extension tube 118 and/or the connector tube 119 extends through the junction box cover 114.

The example method 700 include sealing the coupling between the extension tube and the system waste tube (block 710). In some examples, the sealing is provided by the junction box cover as disclosed in connection with junction box cover 604 of the example lavatory waste tube connection system 600 of FIG. 6. In other examples, the junction box boot 116 is disposed over at least the portion of the extension tube 118 and/or the connector tube 119 to seal the coupling between the extension tube 118 and the system waste tube 108.

The example method 700 includes coupling the extension tube to an outlet of a waste receptacle (block 712). For example, the extension tube 118 is coupled to the vacuum outlet tube 105 of the waste receptacle 106 via the connector tube 119 and/or the fitting 606.

Although the example method 700 is described with reference to the flowchart illustrated in FIG. 7, many other methods of assembling the example lavatory waste tube connection system 102 of FIGS. 1-4 and/or the example lavatory waste tube connection system 600 of FIG. 6 may alternatively be used. For example, the order of execution of the blocks may be changed, and/or some of the blocks described may be changed, eliminated, or combined. Similarly, additional operations may be included in the example method of FIG. 7 before, in between, or after the blocks shown in FIG. 7.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus, and systems have been disclosed that raise a height of a system waste tube above a floor of a lavatory cabin to provide for improved access to the system waste tube during coupling of the system waste tube to the waste receptacle in the cabin. Examples disclosed herein include a junction box to house the extension tube and facilitate sealing of the system waste tube from other components of the lavatory cabin. Example junction boxes disclosed herein have a reduced height at one end of the junction box to reduce interference between the junction box and the arms of an operator as the operator couples the extension tube to an outlet of the waste receptacle. As compared to known lavatory cabins, which may include large cutouts in the floor of the cabin into which the operator reaches his or her hands to make the coupling with the system waste tube, examples disclosed herein raise the height of the system waste tube and can minimize the size of the cutouts in the cabin that accommodate the system waste tube, as the operator does not have to reach into the cutout. Because the coupling between the system waste tube and the waste receptacle is made above the floor of the lavatory cabin, examples disclosed herein reduce ergonomic stresses that can arise due to the confined lavatory cabin environment.

The following paragraphs provide various examples of the examples disclosed herein.

Example 1 includes an apparatus including an extension tube to be coupled to a system waste tube and a junction box to be coupled to a surface of a vehicle lavatory. The junction box is to define a housing for the extension tube.

Example 2 includes the apparatus of example 1, wherein the junction box includes a first end having a first height and a second end having a second height.

Example 3 includes the apparatus of example 2, wherein a portion of the junction box proximate to the first end is coupled to an interior wall of the vehicle lavatory and a portion of the junction box proximate to the second end is coupled to a floor of the vehicle lavatory.

Example 4 includes the apparatus of example 3, wherein the interior wall and the floor define an opening in the vehicle lavatory to receive the extension tube.

Example 5 includes the apparatus of any of examples 1-4, wherein the extension tube has a first tube height, the first tube height sized to extend the system waste tube above a floor of the vehicle lavatory.

Example 6 includes the apparatus of example 5, wherein the first height of the junction box is greater than the first tube height and the second height is less than the first tube height.

Example 7 includes the apparatus of any of examples 1-4, further including a junction box cover to be positioned over the extension tube and to be coupled to the junction box.

Example 8 includes the apparatus of example 7, wherein the junction box cover defines an opening therein, the extension tube to extend through the opening.

Example 9 includes the apparatus of example 7, further including a junction box boot to be positioned over the extension tube and to be coupled to a face of the junction box cover.

Example 10 includes the apparatus of example 9, wherein the junction box boot includes a first diameter at a first end of the junction box boot and a second diameter at a second end of the junction box boot, the second diameter smaller than the first diameter.

Example 11 includes the apparatus of example 10, wherein the first end is to be coupled to the face of the junction box cover.

Example 12 includes the apparatus of example 11, wherein a portion of the junction box boot proximate to the second diameter is to form a seal with the extension tube.

Example 13 includes the apparatus of example 9, wherein the junction box boot includes silicone.

Example 14 includes a method including coupling an extension tube to a system waste tube of a vehicle; positioning a junction box over the extension tube, the junction box defining an opening of a lavatory cabin of the vehicle; coupling a cover to the junction box, the extension tube to extend above the cover; and coupling the extension tube to an outlet of a waste receptacle of the lavatory cabin.

Example 15 includes the method of example 14, further including coupling a junction box boot to the cover to form a seal between the junction box boot and the extension tube.

Example 16 includes the method of examples 14 or 15, further including coupling the extension tube to the outlet of the waste receptacle via a connector tube.

Example 17 includes the method of examples 14 or 15, further including coupling a first portion of the junction box to a wall of the lavatory cabin, the wall including a first opening, and a second portion of the junction box to a floor of the lavatory cabin, the floor including a second opening, the first portion of the junction box to surround the first opening and the second portion of the junction box to surround the second opening.

Example 18 includes a kit including an extension tube to be coupled to a system waste tube. The kit includes a junction box. The junction box has a first height at a first end and a second height at a second end. The extension tube is to be at least partially disposed in the junction box when the junction box is coupled to a surface of a lavatory.

Example 19 includes the kit of example 18, further including a junction box cover.

Example 20 includes the kit of examples 18 or 19, further including a junction box boot.

The following claims are hereby incorporated into this Detailed Description by this reference, with each claim standing on its own as a separate embodiment of the present disclosure.

What is claimed is:

1. An apparatus comprising:
   an extension tube to be coupled to a system waste tube; and
   a junction box to be coupled to a surface of a vehicle lavatory, the junction box to define a housing for the extension tube,
   the junction box including a first portion, a second portion opposite the first portion, and a sidewall extending between the first portion and the second portion, each of the first portion, the second portion, and the sidewall defining a respective opening therein,
   the sidewall to be coupled to an interior wall of the vehicle lavatory and the second portion of the junction box is to be coupled to a floor of the vehicle lavatory, the opening defined in the sidewall to align with an opening defined the interior wall when the sidewall is coupled to the interior wall and the opening defined in the second portion of the junction box is to align with an opening defined in the floor when the second portion is coupled to the floor.

2. The apparatus of claim 1, wherein the junction box includes a first end having a first height and a second end having a second height.

3. The apparatus of claim 2, wherein the extension tube has a first tube height, the first tube height sized to extend the system waste tube above the floor of the vehicle lavatory.

4. The apparatus of claim 3, wherein the first height of the junction box is greater than the first tube height and the second height of the junction box is less than the first tube height.

5. The apparatus of claim 1, further including a junction box cover to be positioned over the extension tube and to be coupled to the junction box.

6. The apparatus of claim 5, wherein the junction box cover defines an opening therein, the extension tube to extend through the opening in the junction box cover.

7. The apparatus of claim 5, further including a junction box boot to be positioned over the extension tube and to be coupled to a face of the junction box cover.

8. The apparatus of claim 7, wherein the junction box boot includes a first diameter at a first end of the junction box boot and a second diameter at a second end of the junction box boot, the second diameter smaller than the first diameter.

9. The apparatus of claim 8, wherein the first end of the junction box boot is to be coupled to the face of the junction box cover.

10. The apparatus of claim 9, wherein a portion of the junction box boot proximate to the second diameter is to form a seal with the extension tube.

11. The apparatus of claim 7, wherein the junction box boot includes silicone.

12. A method comprising:
coupling an extension tube to a system waste tube of a vehicle;
positioning a junction box over the extension tube, the junction box defining an opening of a lavatory cabin of the vehicle;
coupling a first portion of the junction box to a floor of the lavatory cabin on which a waste receptacle is to rest;
coupling a second portion of the junction box to a wall of the lavatory cabin, the wall including a first opening, the floor including a second opening, the second portion of the junction box to surround the first opening and the first portion of the junction box to surround the second opening;
coupling a cover to the junction box, the extension tube to extend above the cover; and
coupling the extension tube to an outlet of the waste receptacle.

13. The method of claim 12, further including coupling a junction box boot to the cover to form a seal between the junction box boot and the extension tube.

14. The method of claim 12, further including coupling the extension tube to the outlet of the waste receptacle via a connector tube.

15. A kit comprising:
an extension tube to be coupled to a system waste tube;
a junction box having a first height at a first end and a second height at a second end,
a first portion of the junction box to be coupled to a first surface of a lavatory, a second portion of the junction box to be coupled to a second surface of the lavatory, the first portion of the junction box to surround a first opening defined in the first surface and the second portion of the junction box to surround a second opening defined in the second surface,
the extension tube to be at least partially disposed in the junction box when the junction box is coupled to the first surface of the lavatory; and
a junction box cover removably couplable to the junction box, the junction box cover extending between the first end and the second end of the junction box when the junction box cover is coupled to the junction box, the junction box cover disposed an angle relative to the first surface of the lavatory when the junction box is coupled to the first surface of the lavatory.

16. The kit of claim 15, further including a junction box boot.

17. The kit of claim 16, wherein the junction box boot includes a first diameter at a first end of the junction box boot and a second diameter at a second end of the junction box boot, the second diameter smaller than the first diameter.

18. The kit of claim 16, wherein the junction box boot includes silicone.

19. The kit of claim 15, further including a connector tube to be coupled to the extension tube.

20. The kit of claim 15, wherein the junction box cover defines an opening to receive at least a portion of the extension tube.

* * * * *